Sept. 17, 1935. J. L. BRILL 2,014,374
AMMONIA RECOVERY
Filed Feb. 26, 1932
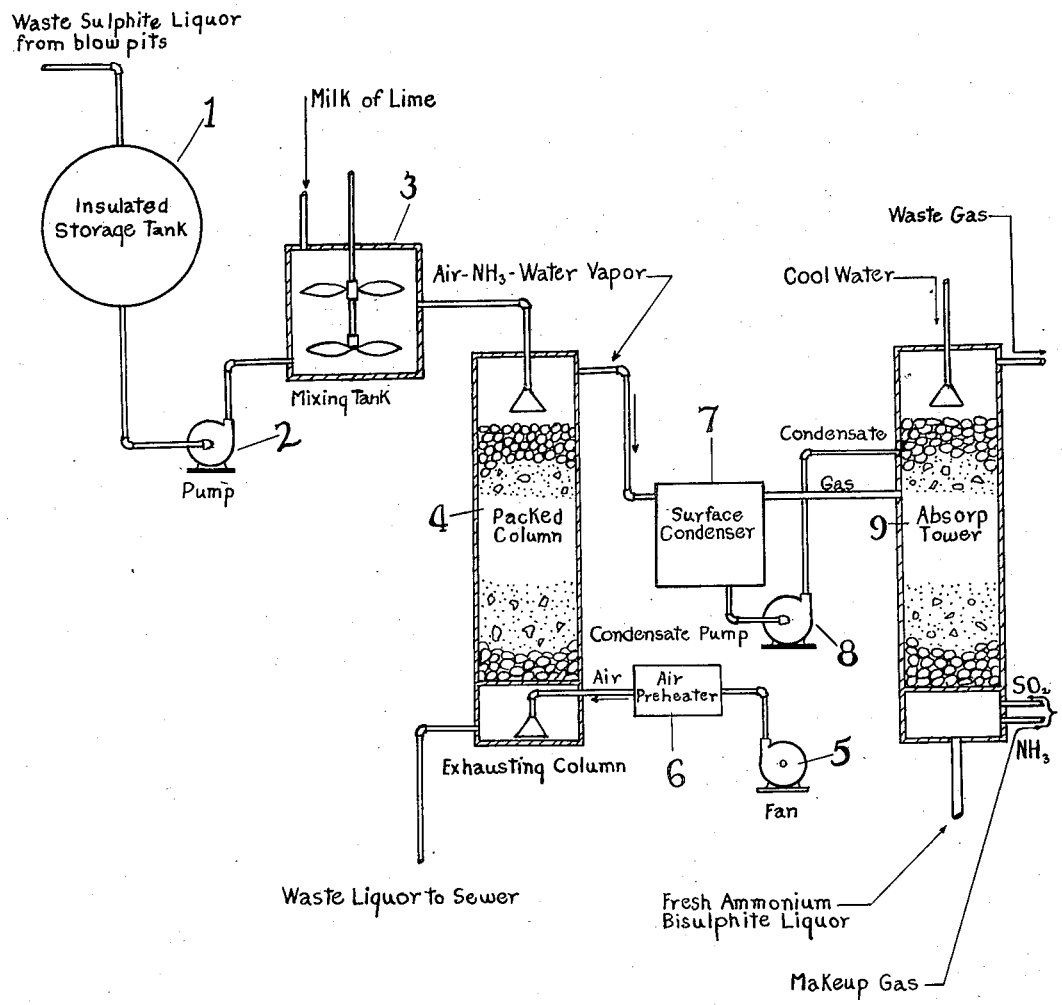
INVENTOR.
John L. Brill
BY
Allan R Plumley
ATTORNEY.

Patented Sept. 17, 1935

2,014,374

UNITED STATES PATENT OFFICE 2,014,374

AMMONIA RECOVERY

John L. Brill, Wilmington, Del., assignor to E. I. du Pont de Nemours & Company, Wilmington, Del, a corporation of Delaware Application February 26, 1932, Serial No. 595,306

2 Claims. (Cl. 23—130)

This invention relates to a process for the recovery and reutilization of ammonia from wood pulp cook liquors and particularly from such liquors containing ammonium bisulfite or ammonium sulfite.

In the preparation of wood pulp by the ammonium bisulfite process and like processes utilizing ammonia-containing liquors it is desirable, in order to conduct the process economically, to recover a large proportion of the ammonia used. There is, however, a relatively small quantity of ammonia in cook liquors of the type usually encountered. This concentration is as a rule below 0.5% of ammonia on the basis of the weight of the liquor, and if the liquor is made alkaline with lime, and the resulting mixture distilled for ammonia recovery, according to any of the ordinary distillation processes, a large quantity of heat (in the form of steam) is required per unit of ammonia recovered.

With a view to eliminate this and other difficulties in the recovery of ammonia from cook liquors, obtained in the ammonium bisulfite or ammonia sulfite pulping process or modifications thereof, it is an object of the present invention to provide an improved process for the recovery and reutilization of ammonia from such liquors. Another object of the invention is to utilize the sensible heat of the cook liquor to effect the recovery of the ammonia.

Other objects and advantages of the invention will be apparent as it is better understood by reference to the following specification and to the accompanying diagrammatic flow sheet.

The method which I have found exceptionally economical comprises essentially a modified distillation process which requires a relatively small quantity of heat to exhaust or drive out the ammonia. Furthermore, in carrying out my process the sensible heat of the cook liquors as discharged from the digesters is used to supply all or nearly all of the heat necessary for the recovery. This recovery process can be used in combination with the ordinary type of sulfite mill acid absorption equipment, and the ammonia absorbed to form fresh ammonium bisulfite cook liquors by adding the necessary "make-up" ammonia to the cycle. However, my recovery system is not necessarily dependent upon being fitted into the ordinary cycle of a sulfite pulp mill and, if desired, it may be operated independently.

The accompanying diagrammatic flow sheet will make the details of the recovery process clear. Referring to the drawing, the waste sulfite liquor immediately upon being discharged from the digester, or the digester blow-pit, not shown, is pumped to an insulated storage tank (1). With proper equipment and care in conserving the heat, the liquor has a temperature of from 85° to 95° C. upon reaching the tank. From here it is forced by the pump (2) into the mixing tank (3) wherein it is limed or otherwise made alkaline, and still at the relatively high temperature passes on to the exhausting column (4), which may be either a plate distilling column, or a packed tower (packed with Raschig rings, for example). It is advisable that this column be well lagged, since heat conservation is an important part of the process. Instead of running the column (4) as a straight distilling column, air or other inert gas (which may be heated or not, as desired) is forced up the tower counter-current to the hot liquor. The inert gas is supplied to the base of column (4) by the fan (5) after passing, if desired, thru the preheater (6). The sensible heat of the liquor is sufficient to drive off most of the ammonia under these conditions; in some cases to recover the last traces of ammonia it may be necessary to add heat to the exhausting column. Steam coils, not shown, may be provided for this purpose, or steam may be forced directly into the column at a convenient point to accomplish its heat effect as well as ammonia desorption effect or the heat may be supplied by any other suitable means. The exhausted liquor is discharged to waste from the bottom of the column. The mixture of hot gases (inert gas, water vapor, $NH_3$) leaving the top of the column is passed thru a cooler, such as the surface condenser (7), which cools the mixture to about 25° C. This causes a large part of the water vapor to condense. The condensed water vapor contains some ammonia, and to assure its recovery the condensate from the cooler is either added directly to the fresh ammonium bisulfate liquor, not shown, or preferably forced by pump (8) to the absorption tower (9), which is of the conventional type in this industry, and introduced at some point in the column, but not too near the top as by such an installation some of the ammonia may be lost to the waste gases.

I have found that by introducing the uncondensed gases at a point toward the top of the conventional $SO_2$ absorption tower, which is usually cylindrical in construction and upwards of 90 feet or more in height, it is possible to accomplish a desired absorption and concentration of $SO_2$ in the down-flowing aqueous ammonia-containing liquid, impossible of attainment due to the reduced partial pressure of $SO_2$ from the sulfur burners, for example, if the $SO_2$ and uncondensed gases are simultaneously passed into the bottom of the tower. Operating accordingly, therefore, the cooled gases pass into the absorption tower at a point, for example ⅙th of the distance or 15 feet from the top thereof or other convenient point above that at which the $SO_2$ is introduced. Make-up ammonia (in that quantity required to make the solution up to the desired ammonium strength, i. e. to replace the process losses of ammonia) is added from anhydrous ammonia storage either as vaporized gas, entering the absorption tower (9) at the base at about the same point as $SO_2$ from the sulfur burners, as shown, or said ammonia may be sprayed into the tower as liquid or aqueous ammonia at the same point as the condensate or introduced at any other convenient point, such as directly to the freshly prepared ammonium bisulfite liquor.

The usual practice of passing cool water into the top of the tower and causing it to flow counter-current to the make-up gas may be employed. The fresh ammonium bisulfite liquor, containing the reclaimed ammonia, leaves the bottom of the tower ready for use in the digester. It should be noted that the $SO_2$ absorption tower may be part of the regular sulfite mill equipment,—no new or additional absorption equipment being required for my recovery process. The economies of operation afforded by my invention, therefore, are self-evident.

It should be noted that it is not necessary to run my process in combination with the regular acid absorption system. If desired, a separate absorption tower may be used, and the absorption carried out according to the method of my invention.

Various changes may be made in the method described without departing from the invention or sacrificing any of the advantages thereof.

I claim:

1. In a process for the utilization of ammonia contained in ammonium bisulfite cook liquors used in paper pulp manufacture the series of steps which comprise alkalizing the hot cook liquor, exhausting ammonia therefrom by passage of an inert gas and steam therethrough, condensing the resultant gases containing some ammonia and introducing the condensate containing water and ammonia toward the top of an absorption tower up which sulfur dioxide and gaseous ammonia are being passed and down which water is being passed, and introducing uncondensed air-ammonia-gas from the condensing operation into said tower at a point about one-sixth of the distance from the top of the absorption tower.

2. In a process for the utilization of ammonia contained in ammonium bisulfite cook liquors used in paper pulp manufacture the series of steps which comprise alkalizing the hot cook liquor, exhausting ammonia therefrom by passage of an inert gas and steam therethrough, condensing the resultant gases containing some ammonia and introducing the condensate containing water and ammonia toward the top of an absorption tower up which sulfur dioxide and gaseous ammonia are being passed and down which water is being passed, and introducing uncondensed air-ammonia-gas from the condensing operation into said tower at a point about one-sixth of the distance from the top of the absorption tower and below the point of introducing the condensate.

JOHN L. BRILL.